United States Patent
Davis et al.

(10) Patent No.: US 6,781,971 B1
(45) Date of Patent: Aug. 24, 2004

(54) SYSTEM AND METHOD FOR PRIORITIZING TRAFFIC CHANNEL MESSAGES

(75) Inventors: Roy Davis, Del Mar, CA (US); Parviz Yegani, Fremont, CA (US); Frank Quick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 09/538,384

(22) Filed: Mar. 29, 2000

Related U.S. Application Data

(60) Provisional application No. 60/127,597, filed on Apr. 2, 1999, and provisional application No. 60/127,597, filed on Apr. 2, 1999.

(51) Int. Cl.[7] ................................................. H04Q 7/00
(52) U.S. Cl. .................. 370/329; 370/395.42; 370/493
(58) Field of Search ................................. 370/341, 331, 370/342, 395.21, 395.4, 395.42, 461, 462, 532, 537, 310, 316, 325, 329, 437, 493, 494, 495

(56) References Cited

U.S. PATENT DOCUMENTS

| | | |
|---|---|---|
| 4,901,307 A | 2/1990 | Gilhousen et al. |
| 5,295,152 A | 3/1994 | Gudmundson et al. |
| 5,311,516 A | 5/1994 | Kuznicki et al. |
| 5,691,974 A | 11/1997 | Zehavi et al. |
| 5,745,860 A | 4/1998 | Kallin |
| 5,771,459 A | 6/1998 | Demery et al. |
| 5,809,018 A | 9/1998 | Lehmusto |
| 5,886,993 A | 3/1999 | Ruszczyk et al. |
| 6,049,537 A * | 4/2000 | Proctor et al. ............... 370/342 |
| 6,125,110 A * | 9/2000 | Proctor et al. ............... 370/331 |

FOREIGN PATENT DOCUMENTS

| | | |
|---|---|---|
| EP | 0801513 | 4/1997 |
| GB | 2301749 | 6/1995 |
| WO | 9608935 | 3/1996 |
| WO | 9748249 | 12/1997 |
| WO | 9852327 | 11/1998 |

* cited by examiner

*Primary Examiner*—Phirin Sam
(74) *Attorney, Agent, or Firm*—Philip R. Wadsworth; Gregory D. Ogrod

(57) ABSTRACT

A system and method places signaling message frames in a traffic channel carrying voice frames so that the signaling message transmission does not seriously impact voice quality. This is accomplished by producing a first stream of voice encoded packets and a second stream of signaling message packets. The signaling message packets are prioritized in the second stream relative to the voice encoded packets in the first stream. An arbitration element arbitrates between the voice encoded and prioritized signaling message packets, which are multiplexed as a function of this arbitration. The multiplexed voice encoded and prioritized signaling message packets are then transmitted.

22 Claims, 4 Drawing Sheets

SYSTEM AND METHOD FOR PRIORITIZING TRAFFIC CHANNEL MESSAGES

This application claims the benefit of provisional application Ser. No. 60/127,597 filed Apr. 2, 1999.

BACKGROUND OF THE INVENTION

1. Field of the Invention

The invention relates to wireless communications, and more particularly, to a system and method for prioritizing signaling messages that are multiplexed into a digital voice or data transmission channel to reduce the impact of the signaling transmission on voice quality.

2. Description of the Related Art

Wireless communication systems generally are comprised of many mobile stations (also referred to as user terminals) and one or more base stations. A base station will provide service to several mobile users via individual communications channels.

A typical terrestrial wireless communications system comprises at least one terrestrial base station and a number of mobile stations (for example, a mobile telephone). In a satellite communications system, links between a mobile station (MS) and a base station (BS) or gateway (GW) are provided by one or more relay satellites. A base station can link a mobile station to other mobile stations or to a terrestrial network, such as a public telephone system.

A variety of multiple access communications systems have been developed for transferring information among a large number of system users. Three known techniques employed by such multiple access communications systems include time division multiple access (TDMA), frequency division multiple access (FDMA), and spread-spectrum modulation techniques, such as code division multiple access (CDMA) spread-spectrum techniques, the basics of which are well known in the art.

The use of CDMA techniques in a multiple access communications system is disclosed in the teachings of U.S. Pat. No. 4,901,307, which issued Feb. 13, 1990, titled "Spread Spectrum Multiple Access Communication System Using Satellite Or Terrestrial Repeaters," and U.S. Pat. No. 5,691,974 which issued Nov. 11, 1997, titled "Method And Apparatus For Using Full Spectrum Transmitted Power In A Spread Spectrum Communication System For Tracking Individual Recipient Phase Time And Energy," which are both commonly assigned with the present invention, and are incorporated herein by reference.

The above-mentioned patent documents disclose multiple access communications systems in which a large number of generally mobile or remote system users each employ at least one mobile station to communicate with other system users or users of other connected systems, such as a public telephone switching network. The mobile stations communicate through base stations using CDMA spread-spectrum type communications signals.

In a typical spread-spectrum communications system, a set of preselected pseudo random noise (PN) code sequences is used to modulate (i.e., "spread") information signals over a predetermined spectral band prior to modulation onto a carrier signal for transmission as communications signals. PN spreading, a method of spread-spectrum transmission that is well known in the art, produces a signal for transmission that has a bandwidth much greater than that of the data signal. In a "forward" communications link (that is, in a communications link originating at a base station and terminating at a mobile station), PN spreading codes are used to discriminate between signals transmitted by a base station over different beams, and to discriminate between multipath signals. These PN codes are typically shared by all communications signals within a beam.

In a typical CDMA spread-spectrum system, channelizing codes are used to discriminate between signals for particular mobile stations transmitted within a satellite beam on the forward link. That is, a unique orthogonal channel is provided for each mobile station on the forward link by using a unique "channelizing" orthogonal code. Signals intended for conveying information to particular mobile stations are referred to as "traffic channels."

Typical CDMA spread-spectrum communications systems, such as disclosed in U.S. Pat. No. 4,901,307, contemplate the use of coherent modulation and demodulation for forward link mobile station communications. In communications systems using this approach, a "pilot" carrier signal (hereinafter referred to as a "pilot signal") is used as a coherent phase reference for base station-to-subscriber links. That is, a pilot signal, which typically contains no data modulation, is transmitted by a base station throughout a region of coverage. A single pilot signal is typically transmitted by each base station for each frequency used. These pilot signals are shared by all mobile stations receiving signals from the base station.

Pilot signals are used by mobile stations to obtain initial system synchronization and time, frequency, and phase tracking of other signals transmitted by the base station. Phase information obtained from tracking a pilot signal carrier is used as a carrier phase reference for coherent demodulation of signals transmitted on the traffic channels. This technique allows many traffic channels to share a common pilot signal as a phase reference, providing for a less costly and more efficient tracking mechanism. As noted above, a traffic channel is referred to as a channel carrying signals for a particular mobile station.

When a mobile station is not involved in a communications session (that is, the mobile station is not receiving or transmitting user traffic), the base station can convey information to that particular mobile station using a channel known as a paging channel. For example, when a call has been placed to a particular mobile phone, the base station alerts the mobile phone by means of a signal transmitted on the paging channel. Paging channels are also used to distribute system overhead information.

A mobile station can respond to a paging signal by sending a signal over a channel referred to as an "access channel" on the "reverse" communications (that is, the communications link originating at the mobile station and terminating at the base station). The access channel is also used by a mobile station to originate a communication link or call, or send location updating information. A particular access channel is typically associated with a particular paging channel.

Traffic channels include voice data packets (sometimes called voice data "streams") and signaling messages carrying control information and short text messages specific to a mobile station. Voice packets and signaling messages share a single traffic channel. The traffic channel comprises frames that are used to transmit either voice packets or signaling messages (signaling data packets).

Conventional digital voice coding techniques (vocoders) cause single words to be transmitted during several separate traffic channel frames. An artifact of this approach is that degradation of voice reception occurs if voice data frames (notably voice frames including accented syllables) are "blanked," or deleted, in order to transmit critical signaling messages (i.e., those required to maintain the link with the mobile station). The random timing and variable length of critical signaling messages results in voice packets being deleted from the traffic channel data stream for an unpredictable number of traffic channel frames.

In a system that uses a variable data rate vocoder, for typical speech patterns approximately half of the transmitted traffic channel frames are sent at a lower data rate. Special advantage can be taken by delaying signaling messages and multiplexing them into the traffic channel data stream during the lower rate voice frames. These lower rate frames do not occupy the full bandwidth of the traffic channel, and the spare bandwidth can be used to carry signaling messages without affecting voice quality.

What is needed is a technique to efficiently transmit voice packets and signaling messages without degrading voice reception by reducing the impact of the above mentioned unpredictability.

SUMMARY OF THE INVENTION

One purpose of the invention is to prioritize signaling messages by positioning signaling message frames within a traffic channel to reduce their impact on voice quality. In other words, the invention places signaling message frames within the traffic channel so as to avoid unnecessary deletion of voice information. Because air links are bandwidth-limited by nature, arbitrary voice frame deletions would adversely affect voice signal quality. For example, voice quality will be seriously degraded if arbitrarily placed signaling messages made up more than five percent of the traffic channel frames. According to the present invention, signaling messages using up to fifteen percent of the total traffic channel bandwidth will not be perceivable to the human ear.

BRIEF DESCRIPTION OF THE DRAWINGS

The features, objects, and advantages of the present invention will become more apparent from the detailed description set forth below when taken in conjunction with the drawings in which like reference characters identify correspondingly throughout, the left-most digit of each reference number corresponds to the figure in which the reference number is first used, and wherein.

DETAILED DESCRIPTION OF THE PREFERRED EMBODIMENTS

Table of Contents
1. Introduction 7
2. A Typical Satellite Communications System 7
   a. A typical Satellite Communications System 7
   b. A Typical Cellular Communications System 7
3. Prioritizing Traffic Channel Messages 7

4. Signaling Message Delay Requirements 9
   a. High Priority Signaling Messages 13
   b. Low Priority Signaling Messages 14
5. Call Processing Procedures for Traffic Channel Signaling with Message Prioritization 14
   a. Exemplary Statistics for Forward and Reverse Traffic Channels 14
6. Pseudo Code for Call Processing Procedures 16
   a. Multiplex Sublayer 16
   b. Layer 210 Message Priority 16
   c. Transmission Priority 17
   d. Transmission 18
7. Radio Link Protocol (RLP) 21
8. RLP Frame Formats 21
   a. RLP Control Frames 21
   b. RLP Data Frames 22
   c. RLP Idle Frames 23
   d. RLP NAK Frames 24
9. Procedures 24
   a. Initialization/Reset 24
   b. Data Transfer 25
10. Frame Validity Checks 29
1. Introduction The present invention is a system and method for prioritizing signaling messages on the forward and reverse traffic channels of a mobile wireless communications system.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention.

2. Wireless Communications System

2a. A Typical Satellite Communications System

Figure 1A:
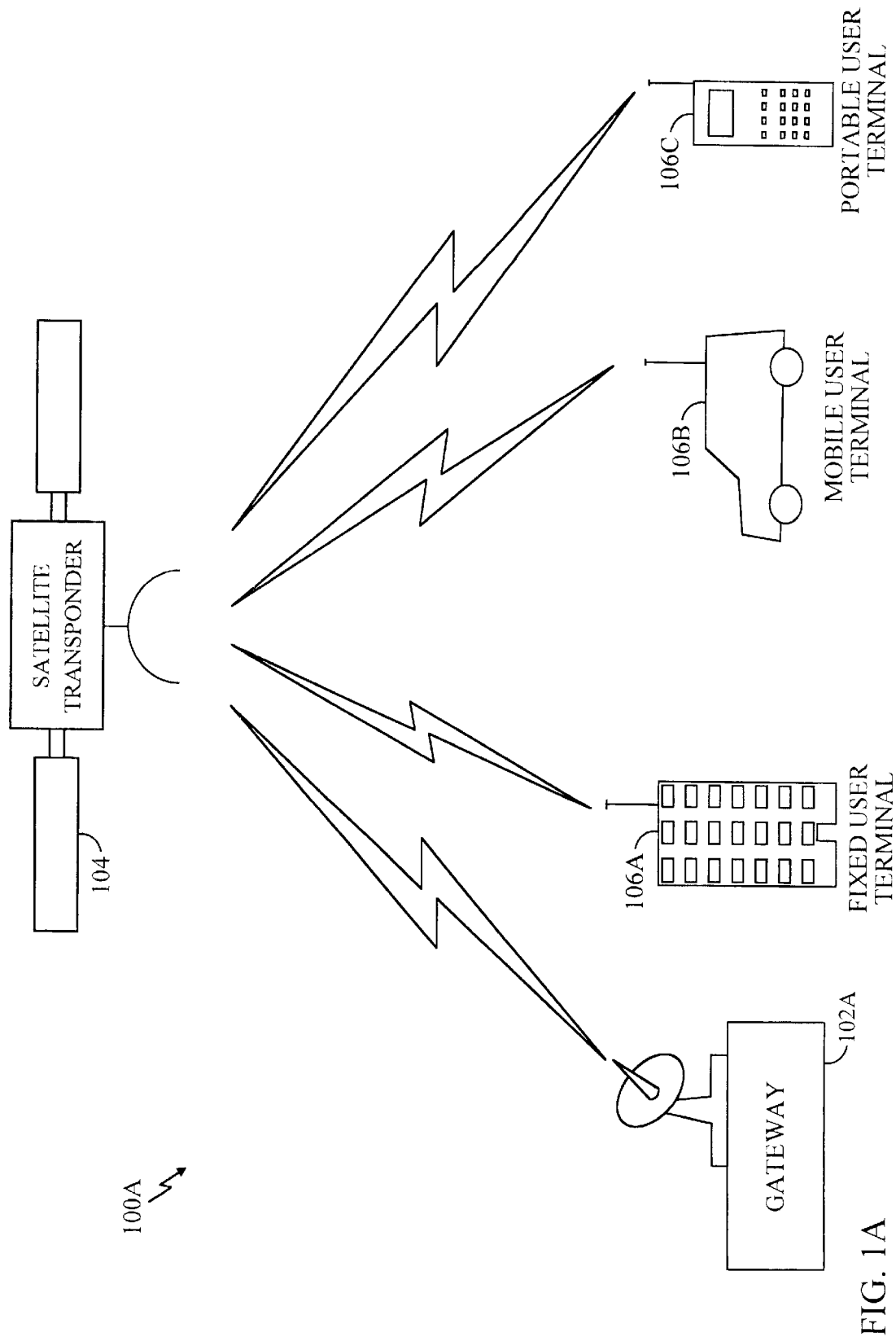
FIG. 1*a* depicts a typical satellite communication system 100A.

FIG. 1*a* depicts a typical satellite communication system 100A. Satellite communication system 100A comprises base station or gateway 102A, one or more relay satellites 104, and mobile stations 106. Mobile stations 106 are generally of three types: fixed station or user terminals 106A, which are typically mounted in or on permanent structures; mobile stations 106B, which are typically mounted in vehicles; and portable stations 106C, which are typically hand-held. Base station 102 communicates with mobile stations 106 via relay satellite 104.

2b. A Typical Cellular Communications System

Figure 1B:
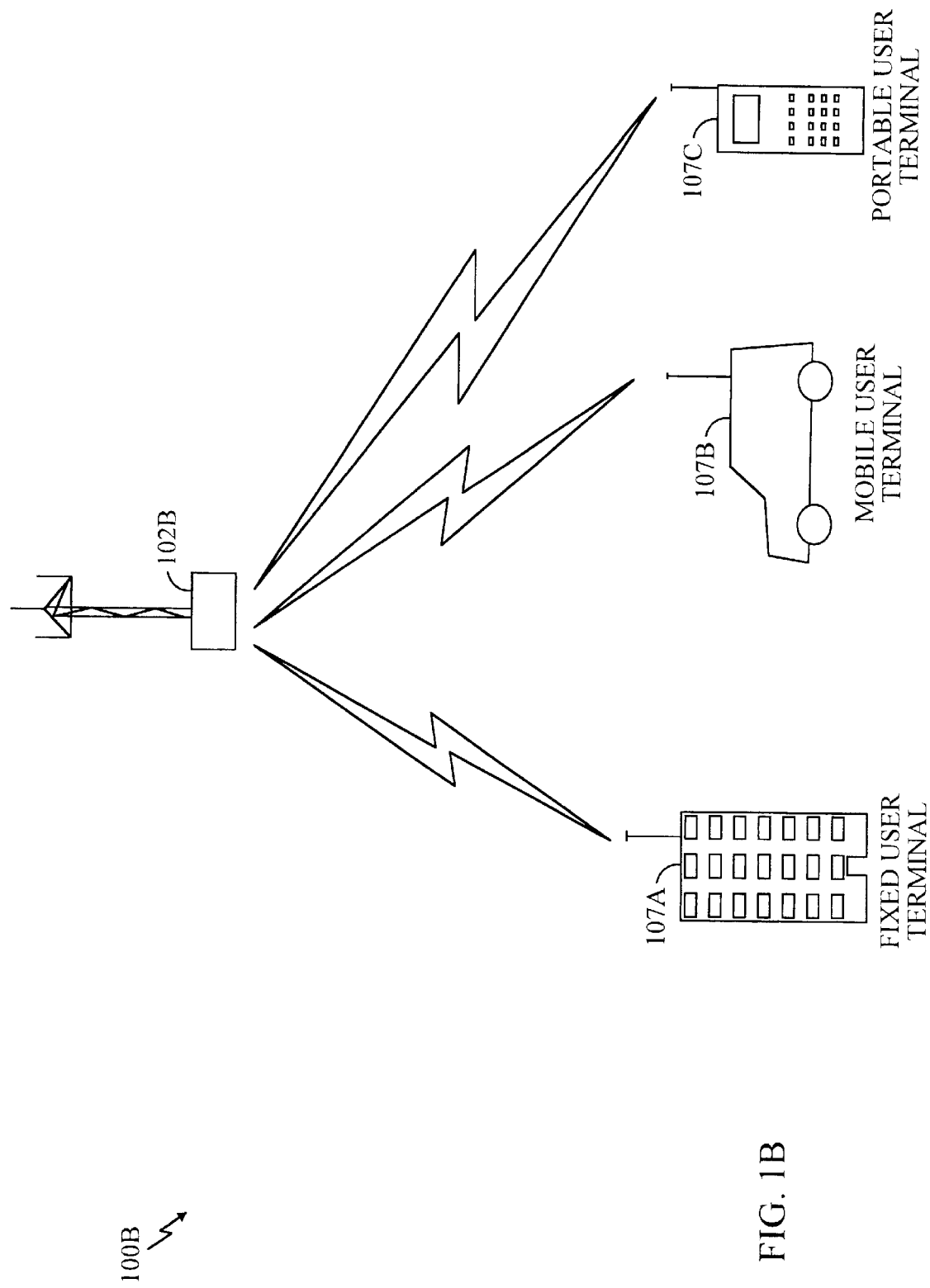
FIG. 1*b* depicts a typical cellular communication system 100B.

FIG. 1*b* depicts a typical cellular communication system 100B. Cellular communication system 100B comprises base station 102B and mobile stations 107. Mobile stations 107 are generally of three types: fixed stations 107A, which are typically mounted in permanent structures; mobile stations 107B, which are typically mounted in vehicles; and portable stations 107C, which are typically hand-held.

3. Prioritizing Traffic Channel Messages

Various priority schemes can be used as a scheduling method to transmit voice and signaling traffic over a traffic channel of a satellite communication system (or any other CDMA, TDMA, or other system for that matter). The simplest priority scheme is a static (or fixed) priority. In a conventional static scheme, priority is always given to messages that control the communication system (signaling messages) over messages that merely contain voice data. As a result, signaling messages are sometimes transmitted instead of voice packets. This preemption causes degradation of voice signals.

To avoid this situation, the inventors have developed a dynamic priority scheme that schedules the transmission of signaling messages and voice packets. Priority scheduling reduces the effect of signaling traffic on the quality of voice when voice and signaling traffic are transmitted sharing traffic channel frames. The priority scheme differentiates between three different priority classes: high priority signaling traffic, low priority signaling traffic and voice traffic in order to meet the delay requirement of each traffic type. High priority signaling traffic and voice traffic are more delay sensitive and each have a different delay requirement. Low priority signaling traffic is less delay sensitive and is transmitted when the channel is not used for full rate voice packets or high priority signaling traffic.

The disclosed priority scheme gives highest priority to the high priority signaling traffic, which has the strictest delay requirement. Voice traffic, however, is given priority over the low priority signaling traffic. The scheme, therefore, is designed to minimize voice packet loss, guarantee the timely delivery of urgent (time-critical) signaling messages, and provide a bounded delay for the low priority signaling messages. Note that throughout this document the terms "time-critical" and "high priority," and the terms "non-time-critical" and "low priority" are used interchangeably.

Thus, the main goal of the message prioritization of the invention is to reduce the effect of signaling traffic on the quality of received voice signals when voice packets and signaling messages are transmitted sharing traffic channel frames. According to a preferred embodiment of the present invention, a frame is 20 milliseconds (msec) long. Based on the disclosed priority scheme, time-critical signaling messages are given higher priority over voice packets. Signaling messages are assigned a priority delivery time (PDT) (i.e., the maximum possible transmission delay time). When the transmission of a signaling message is delayed longer that its PDT, it has timed out and is given higher priority. An exemplary PDT for time-critical signaling messages is five frames, or 100 msec. Depending on assigned priority and PDT values, time-critical signaling messages are transmitted via blank-and-burst, dim-and-burst, or brighten-and-burst techniques as described below. However, low priority signaling messages are delayed and sent with voice packets via either dim-and-burst or brighten-and-burst transmission, when the vocoder uses lower transmission-rate frames.

PDTs are measured according to a system clock of the mobile station. The waiting time before a signaling message is transmitted is measured beginning at the instant it is dispatched, regardless of its priority. If its PDT is reached before it is transmitted, it is re-prioritized for prompt transmission. The implementation and functionality of system clocks and the use of timers in general would be apparent to a person skilled in the relevant art.

In contrast, conventional systems typically send signaling messages as soon as they are ready for transmission. In a conventional system, the resulting deletion of voice packets results in degradation of the voice signal.

In a dim-and-burst mode of the present invention, the vocoder is forced to transmit voice data packets at a maximum rate less than full frame rate so that signaling data packets can be sent immediately by filling in the remainder of the frame. The priority scheme of the present invention alternatively uses a brighten-and-burst mode to send signaling data packets along with voice data packets when the vocoder is transmitting at less than the full frame rate.

4. Signaling Message Delay Requirements

Signaling messages transmitted on the traffic channel have different delay requirements. Messages and orders that are transmitted for purposes of radio resource management (RM) and mobility management (MM) normally have tighter delay requirements than other messages. RM includes messages about power control, handoff operations, and the like. MM includes messages about authentication signaling, traffic channel registration, and the like. RM and MM messages must be transmitted with minimum delay to avoid delays in call or handoff setup that could result in call loss. In contrast to RM and MM, messages and orders that are used for maintenance, obtaining status information about the mobile station, and providing supplementary services are not required to be transmitted immediately. These messages can be delayed and transmitted when voice activity is low and the traffic channel has some leftover bandwidth to transmit them using dim-and-burst or brighten-and-burst modes. To take advantage of this, the present scheduling scheme differentiates between signaling messages with different delay requirements.

To meet the transmission requirements of signaling messages and voice data when voice and signaling traffic share traffic channel frames, a multiplex (MUX) sublayer was designed to support simultaneous transmission of signaling traffic and voice traffic. The multiplex sublayer accomplishes this by splitting a high-rate frame into two pieces: part used for low rate voice traffic and the remainder for the signaling traffic.

Figure 2:
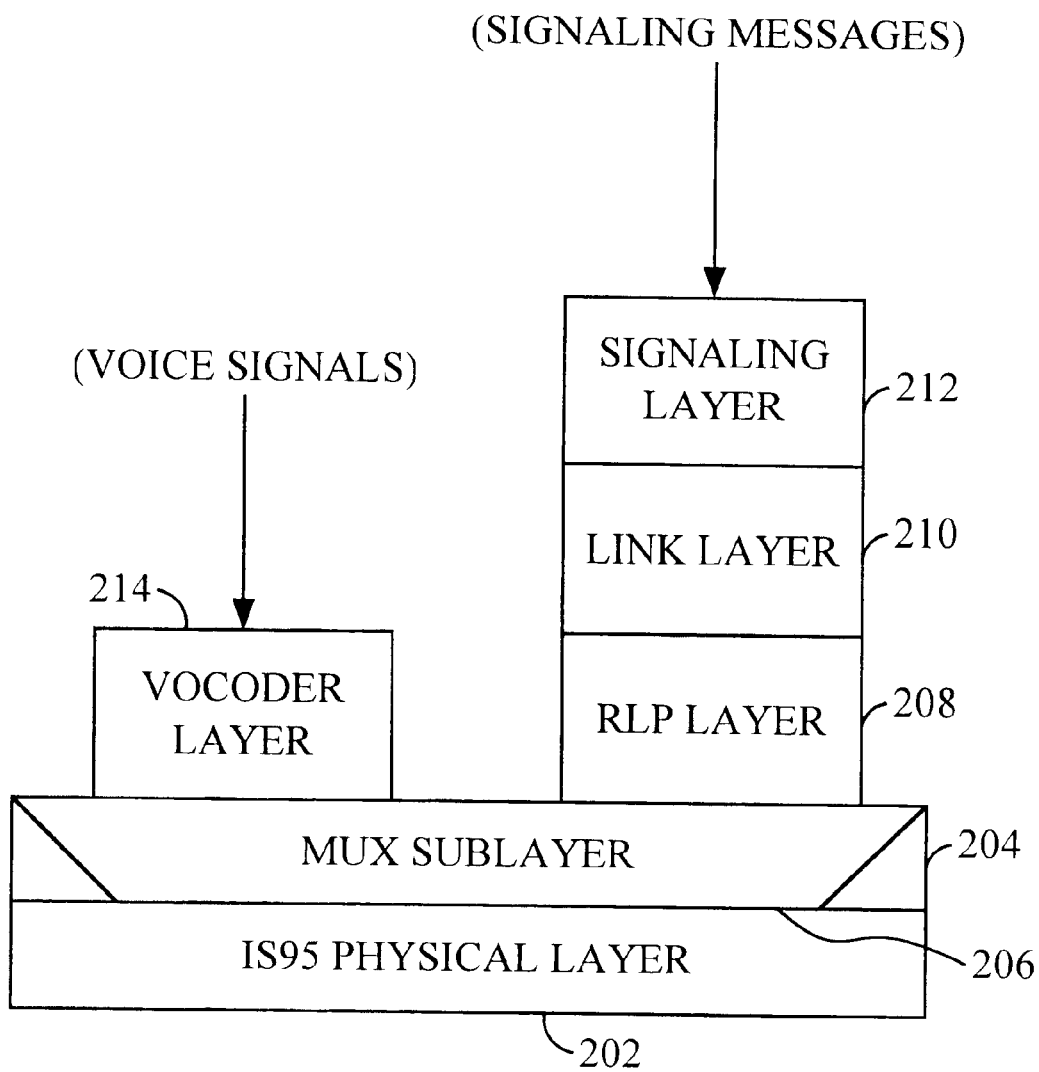
FIG. 2 shows the interrelationship of protocol layers in a mobile station according to the present invention.

FIG. 2 shows the interrelationship of protocol layers in a CDMA-based wireless communication system according to the invention. A physical layer 202 performs functionality according to a standard communications protocol, such as IS-95. A multiplex sublayer 204 performs the function of selecting voice and signaling traffic according to the prioritization scheme of the present invention. The prioritized traffic is passed directly to physical layer 202, as represented by the interface 206 between layers 202 and 204. A radio link protocol (RLP) 208 passes information between multiplex sublayer 204 and a link layer (layer 2) 210. RLP 208, described later, is an enhancement to the protocol defined in IS-95 that improves the effective frame error rate of the traffic channel to provide more reliable signaling when long signaling messages are sent. Layer 210 implements a selective repeat protocol that retransmits a signaling message until it is acknowledged by the receiver. A signaling layer 212 passes signaling traffic (e.g., RM or MM type signaling messages) via layers 210 and 208 as signaling data packets. A voice coder (vocoder) 214 passes voice packets to multiplex sublayer 204 as voice data frames. The vocoder can transmit streams of voice data packets at several common rates, including: full-rate frame (9600 bps), half-rate frame (4800 bps), quarter-rate frame (2400 bps) and eighth-rate frames (1200 bps). Physical layer 202 transmits signals via an air link using CDMA signal processing operations, as would be apparent to a person skilled in the relevant art.

In order to meet any relative delay requirements for different messages, the signaling layer 212 passes signaling messages to the multiplex sublayer 204 with a PDT value (the maximum latency for beginning to transmit individual messages). The multiplex sublayer 204 is controlled to classify signaling message data to be transmitted as high priority or low priority. Multiplex Sublayer 204 is also controlled to classify high priority signaling message data as preemptive if any of the following are true; otherwise, the multiplex sublayer 204 is controlled to classify high priority message data as non-preemptive:

I. More than about 200 msec have elapsed since the PDT has timed out (i.e., the signaling message has been waiting to be transmitted for more than PDT time units plus 200 msec); or II. While the signaling message is being transmitted, data from another signaling message are classified as preemptive.

The action taken for a signaling message depends on its priority. The rules for these actions are listed in Table 1. Columns 1 and 2 of Table 1 list whether high or low priority is necessary. The action taken by the multiplex sublayer is listed in the right-most column. For example, in one possible configuration, voice traffic is considered primary traffic while data traffic and fax transmission are considered secondary traffic.

TABLE 1

Summary of the Priority Scheduling Procedures

| High Priority Signaling Message | Low Priority Signaling Message | Primary Traffic | Secondary Traffic | Action taken by the multiplex Sublayer |
|---|---|---|---|---|
| yes | — | no | no | select first high priority signaling message lowest allowable traffic frame rate that can carry signaling message data blank-and-burst |
| pre-emptive | — | yes | yes | highest allowable frame rate that can carry signaling message data blank-and-burst |
| no | — | yes | yes | lowest traffic frame rate that can carry the data |
| no | yes | no (yes) | yes (no) | lowest traffic frame rate that can carry signaling and traffic data dim-and-burst |
| no | yes | no | no | lowest traffic frame rate that can carry signaling data blank-and-burst |
| no | no | no | no | send null traffic data |

To take advantage of the above priority scheme, signaling messages are queued (e.g., buffered) during the traffic channel operation. There are many ways to implement the priority scheduling. One realization of the scheme is to allow all signaling messages to enter a long time queue. A high-priority signaling message with the smallest PDT is placed at the head of the queue (or immediately following any signaling messages that have expired PDTs). A low-priority signaling message is placed somewhere in the back of the queue, based on its PDT relative to the PDTs of other queued items. High priority signaling messages that are either timed out or about to time out can preempt voice packets at frame boundaries during a call. Low priority signaling messages are queued until the vocoder uses low rate frames to transmit voice data packets. In this case, signaling data and low rate voice packets are transmitted via a dim-and-burst or brighten-and-burst technique.

Figure 3:
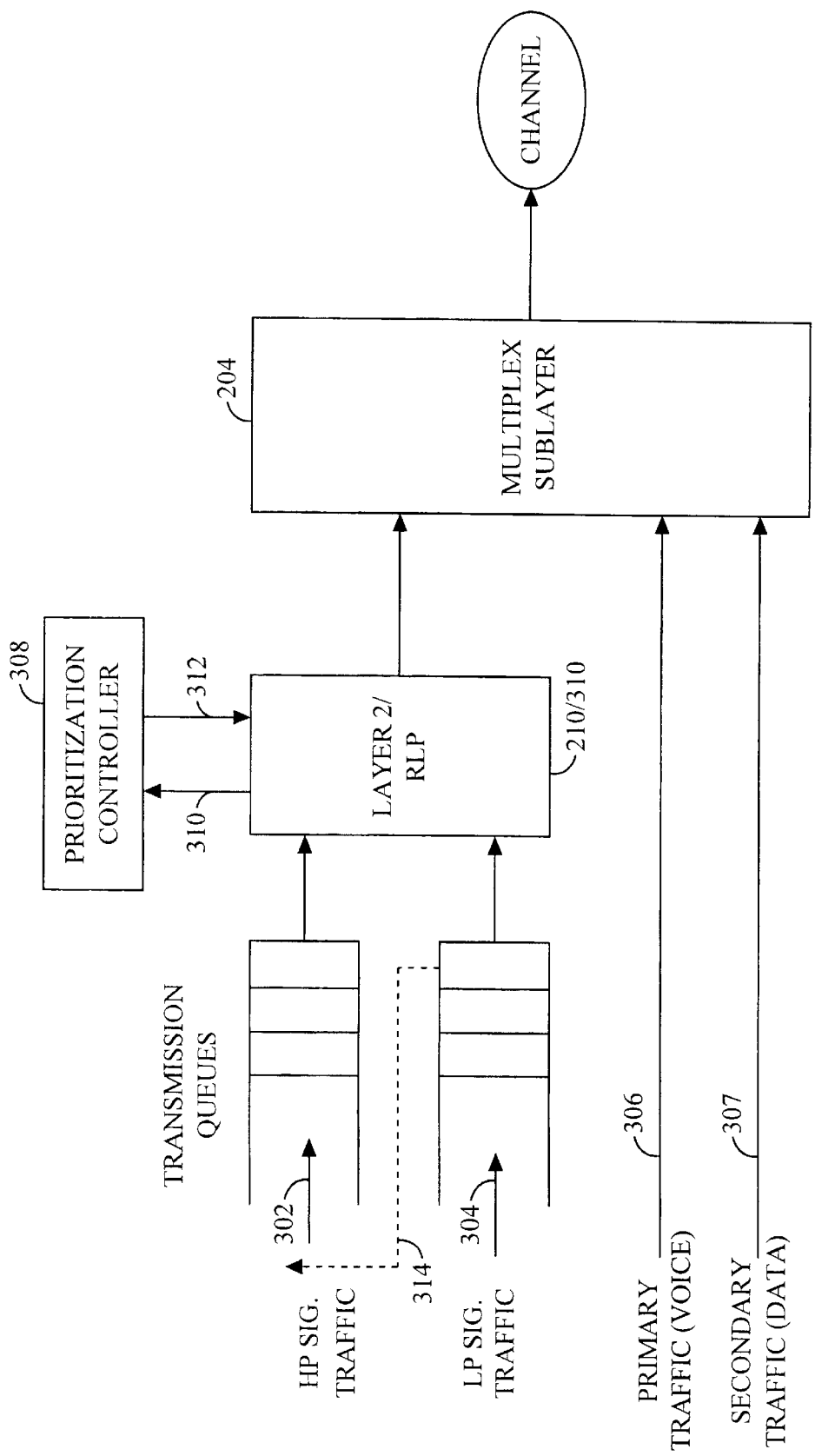
FIG. 3 is a block diagram illustrating queues implementing signaling traffic prioritization according to the present invention.

In a preferred embodiment of the invention, two separate queues for signaling traffic are employed, as shown in FIG. 3. A first queue 302 is used to handle high priority signaling traffic and a second queue 304 is used to handle low priority signaling traffic. Vocoder 306 generates voice data packets that are passed to layers 210/208. The vocoder, depending on the voice activity, can furnish voice data packets at several rates.

Based on signaling input information received from layers 208/210, the multiplex sublayer 204 selects an available vocoder rate to optimize channel bandwidth. As a result, an appropriate mix of voice and signaling packets are selected to be transmitted. Scheduling of the signaling message transmission is done according to the prioritization scheme of the present invention, and in the preferred embodiment, according to the rules set forth above in Table 1. A priority bypass 314 depicts re-prioritizing of low priority signaling messages (i.e., packets). Re-prioritizing of low priority signaling messages is performed by the prioritization control function within Layer 2/RLP 210/208.

Preferably, the prioritization function is implemented as a processing element (e.g., controller logic) operating in accordance with software being executed in Layer2/RLP. The prioritization function may also be implemented with a combination of software, hardware and firmware in accordance with the IS-95 standard as would be apparent.

Signaling messages belonging to each priority class are served on a First-Come First-Served (FCFS) basis. When entering queues 302 or 304, a signaling message's position is determined by its assigned PDT. The scheme, in this case, adjusts the relative priorities of signaling messages by imposing a limit on the maximum queuing delay experienced by a low priority signaling message in the system. When the waiting time of a signaling message in the low priority queue 304 exceeds a fraction of the PDT, that signaling message is moved to the high priority queue (as represented by priority bypass 314). (Actual "moving" of signaling messages between queues may not be necessary and is implementation specific; mere reassignment of priority may be sufficient as would be apparent to a person skilled in the relevant art.) A signaling message that changes priority is treated as a newly arriving high priority signaling message, but retains its original delay requirement (i.e., its PDT is not re-set). The queueing delay of a signaling message before it joins the higher priority queue is bounded by the delay limit of the low priority queue 304. By properly adjusting the delay limit for each queue a signaling message can be delivered before its deadline expires.

4a. High Priority Signaling Messages

The signaling messages listed below in Table 2 are examples of signaling message types considered time-critical. If a given one of these signaling messages is not transmitted before its PDT (e.g., 200 msec), it is classified as a high priority message. For more details of the signaling messages that are listed in Table 2 please refer to the IS-95 standard specification.

TABLE 2

Examples of Time-critical Signaling Message Types

| | |
|---|---|
| 1. | Messages with explicit action time or other specified time limits |
| | Service Option Control Message |
| | Service Connect Message |
| | Service Connect Completion Message |
| | Long Code Transition Response order |
| | Lock until Power-Cycled Order |
| | Continuous DTMF Tone Order |
| | Origination Continuation Message |
| | Connect Order |
| 2. | Messages sent as/carrying acknowledgment |
| | Base station Acknowledgment Order |
| | Mobile station Acknowledgment Order |
| | Mobile station Reject Order |
| 3. | Messages transmitted during power control and handoff operations |
| | Pilot Measurement Request Order |
| | Pilot Strength Measurement Message |
| | Extended Handoff Direction Message |
| | Handoff Completion Message |
| | Power Measurement Report Message |
| | In-Traffic System Parameter Message |

4b. Low Priority Signaling MessagesAll other signaling messages are considered not to be time-critical.

Signaling messages that are not time-critical have a relatively long PDT and are considered as non-time-critical or low priority signaling messages. As indicated above, a low priority signaling message is reclassified as high priority if it is not transmitted before its PDT.

5. Call Processing Procedures for Traffic Channel Signaling with Message Prioritization As described in the previous sections, message prioritization according to the invention reduces the adverse impact of signaling traffic on the quality of the received vocoded signals. And as noted, high priority signaling messages can only tolerate short delays, while low priority signaling messages can stand much longer delays. If the vocoder is not running at full rate, then the high priority message is sent right away. If the vocoder is running at full rate, a signaling message takes priority over voice frames only when it has timed out. The latter situation would result in a "forced" blank frame (blank-and-burst) or a "forced" lower-rate vocoder frame (dim-and-burst).

5a. Exemplary Statistics for Forward and Reverse Traffic Channels

As an example, Forward and Reverse Traffic Channels statistics for a satellite communication system (see FIG. 1a) are discussed in this section. Tables 3 an 4 list example blank and burst frame statistics for forward and reverse traffic channels, respectively. Each table includes three main columns. The first column lists typical transmission rates for a satellite system. (Rate sets 1 and 2 as shown represent typical mixes of the three rates.) The second and third main columns list, for a given transmission rate, the number of blank-and-burst frames expected during a single call (about 80 seconds in duration) without message prioritization and with message prioritization (see columns 2 and 3, respectively). Both the second and third main columns have subcolumns that list the number of blank-and-burst frames with and without consideration of the effects of transient terrain blockage for transmission of signaling packets. (Terrain blockage typically results in higher error rates for longer messages, causing more transmissions of signaling messages.)

TABLE 3

Blank and Burst Frames Statistics for the Forward Traffic Channel with and without Message Prioritization (Number of Blank and Burst Frames per call)

| Transmission Rate (bps) | Without Message Prioritization | | With Message Prioritization | |
|---|---|---|---|---|
| | Without Blockage | With Blockage | Without Blockage | With Blockage |
| 9600 | 49 | 69 | 1 | 1 |
| 4800 | 72 | 107 | 23 | 41 |
| 2400 | 169 | 249 | 16 | 27 |
| Rate Set 1 | 116 | 172 | 20 | 34 |
| Rate Set 2 | 112 | 165 | 16 | 27 |

TABLE 4

Blank and Burst Frames Statistics for the Reverse Traffic Channel with and without Message Prioritization (Number of Blank and Burst Frames per call)

| Transmission Rate (bps) | Without Message Prioritization | | With Message Prioritization | |
|---|---|---|---|---|
| | Without Blockage | With Blockage | Without Blockage | With Blockage |
| 9600 | 44 | 68 | 1 | 1 |
| 4800 | 83 | 118 | 17 | 34 |
| 2400 | 177 | 245 | 10 | 19 |
| Rate Set 1 | 126 | 175 | 14 | 27 |
| Rate Set 2 | 119 | 166 | 11 | 21 |

It is evident that voice quality will be degraded if signaling traffic is sent by simply blanking voice frames. The disclosed message prioritization scheme is used to minimize this impact. The inventors have determined that the use of this message prioritization scheme significantly reduces the number of blank-and-burst frames sent during a call. For example, the number of blank-and-burst frames sent per call using message prioritization (Rate Set 2, without blocking) is 16 frames on the forward channel and 11 frames on the reverse channel. Compare these with 112 and 119 (Tables 3 and 4, respectively) blank-and-burst frames sent on the forward and reverse traffic channels without message prioritization. Hence, the signaling traffic that would impact voice quality in this case is reduced to a tolerable value of 0.57% (of the total traffic) on the forward direction and 0.34% on the reverse direction when message prioritization is used.

6. Pseudo Code for Call Processing Procedures

A detailed description of the multiplex sublayer prioritization scheme is described in this section.

6a. Multiplex Sublayer

The multiplex sublayer provides the following services to the higher protocol layers.

I. For transmitted Traffic Channel frames:
   A. Accepting primary, secondary and signaling channel traffic data from the higher protocol layers, according to priority.
   B. Forming traffic channel frames for transmission, containing data from one or more higher protocol layers.
   C. Providing message framing and reliable delivery of Layer 210 signaling messages, using the Radio Link Protocol (RLP).

II. For received Traffic Channel frames:
   A. Classification of received traffic channel frame types.
   B. Separating primary, secondary and signaling channel traffic data, and routing the data to the appropriate higher protocol layer.
   C. Providing the Layer 210 signaling protocol With an indication of the start of messages.

The multiplex sublayer uses the physical layer for traffic channel frame transmission and reception.

6b. Link Layer (Layer 210)

The multiplex sublayer transmits all new RLP frames containing the parts of each Layer 212 message before transmitting any new RLP frame containing part of any other Layer 212 message.

The signaling Layer 210 passes Layer 212 messages to the multiplex sublayer with a PDT value. The multiplex sublayer classifies Layer 212 message data to be transmitted as high priority or low priority according to the following rules:

I. If the current system time is before the indicated PDT, the multiplex sublayer shall classify the signaling message data as low priority.

II. If the current system time is later than the indicated PDT, the multiplex sublayer shall classify the signaling message data as high priority.

III. If the system time exceeds the indicated PDT, either before or after the transmission of the first RLP data frame of the signaling message, the multiplex sublayer shall reclassify the remaining signaling message data as high priority.

IV. If, after the transmission of the first RLP data frame of a low priority signaling message, data from another signaling message are classified as high priority, the multiplex sublayer shall reclassify the remaining data from the signaling message being transmitted as high priority.

The multiplex sublayer shall classify Layer 212 message data as preemptive if any of the following are true; otherwise, the multiplex sublayer shall classify Layer 212 message data as non-preemptive.

I. The current system time is more than 200 msec later than the indicated PDT; or II. While the signaling message is being transmitted, data from another signaling message are classified as preemptive.

6c. Transmission Priority

The multiplex sublayer shall classify the data that are available for transmission from RLP and higher protocol layers into the priority classes defined below. The higher protocol layers are signaling Layer 210 data and data generated by the service options using primary and secondary traffic.

In order of priority, with highest priority first, the data priority classes are:

I. Preemptive high priority signaling data, consisting of (with highest priority first):
  A. RLP control frames.
  B. RLP data frames being resent in response to received RLP frames that are not acknowledged (NAK'd) by the base station.
  C. Preemptive high priority Layer 210 message data (contained in RLP data frames being sent for the first time).
  D. RLP NAK frames.

II. Non-preemptive high priority signaling data, consisting of:
  A. Non-preemptive high priority Layer 210 message data (contained in RLP data frames being sent for the first time).

III. Primary and secondary traffic data. Unless otherwise specified in the service option specifications, service option data shall be prioritized as follows (with highest priority first):
  A. Voice services.
  B. Synchronous (transparent) data services.
  C. Circuit-switched asynchronous (non-transparent) data or fax.
  D. Packet-switched data.

If primary and secondary traffic carry the same type of service option data, primary traffic data shall have priority over secondary traffic data.

IV. Low priority signaling data, consisting of (with highest priority first):
  A. Low priority Layer 210 message data (contained in RLP data frames being sent for the first time).
  B. RLP idle frames.

6d. Transmission

When the physical layer is ready to send a traffic channel frame, the multiplex sublayer shall perform the following:

I. If high priority signaling data are available for transmission, the multiplex sublayer shall perform the following:
  A. The multiplex sublayer shall select the data with highest priority among the high-priority signaling data available for transmission.
  B. If the service options using primary and secondary traffic have no data to send, the multiplex sublayer shall select the lowest traffic channel frame rate allowed under the connected service configuration, that can carry the signaling data. The multiplex sublayer shall form a blank-and-burst traffic channel frame and forward it to the physical layer for transmission.
  C. If the service options using primary and secondary traffic have data to send, the multiplex sublayer shall perform the following:
    1. If the highest priority signaling data are preemptive high-priority signaling data of a length requiring a blank-and-burst traffic channel frame at the highest allowable traffic channel frame rate, the multiplex sublayer shall form a blank-and-burst traffic channel frame at the highest allowable traffic channel frame rate, and shall forward the traffic channel frame to the physical layer for transmission.
    2. Otherwise, the multiplex sublayer should form a dim-and-burst traffic channel frame containing signaling data and primary or secondary traffic data, and forward the traffic channel frame to the physical layer for transmission. (The multiplex options defined in this specification provide dim-and-burst frames for primary and signaling traffic only. For these multiplex options, the multiplex sublayer forms a blank-and-burst frame containing signaling when only signaling and secondary traffic are available for transmission.) The dim-and-burst frame should be formed using the lowest allowable traffic channel frame rate that can carry both the signaling and traffic data.

II. If there are no high priority signaling data to send, and the service options using primary and secondary traffic both have data to send, the multiplex sublayer should form a traffic channel frame containing primary and secondary data. The multiplex sublayer shall select the lowest traffic channel frame rate allowed under the connected service configuration, that can carry the data. The multiplex sublayer shall forward the traffic channel frame to the physical layer for transmission.

III. If there are no high priority signaling data to send, and either the service option using primary traffic or the service option using secondary traffic, but not both, have data to send, the multiplex sublayer shall perform the following:
  D. If there are low priority signaling data to send, and the primary or secondary traffic data size does not exceed the traffic part of a dim-and-burst traffic channel frame, the multiplex sublayer shall select the low-priority signaling data with highest priority among the low-priority signaling data available for transmission. The multiplex sublayer shall select the lowest traffic channel frame rate allowed under the connected service configuration that can carry both the signaling and traffic data. The multiplex sublayer shall form a dim-and-burst traffic channel frame containing traffic and signaling data and shall forward the traffic channel frame to the physical layer for transmission.

E. Otherwise, the multiplex sublayer shall select the lowest traffic channel frame rate allowed under the connected service configuration that can carry the traffic data. The multiplex sublayer shall form a traffic channel frame containing only traffic data, and shall forward the traffic channel frame to the physical layer for transmission.

IV. If there are no high priority signaling data to send, and the service options using primary and secondary traffic have no data to send, the multiplex sublayer shall perform the following:

A. If low priority signaling data are available for transmission, the multiplex sublayer shall select the low-priority signaling data with highest priority among the low-priority signaling data available for transmission. The multiplex sublayer shall select the lowest traffic channel frame rate allowed under the connected service configuration, that is sufficient to carry the selected signaling data. The multiplex sublayer shall form a blank-and-burst traffic channel frame and forward it to the physical layer for transmission.

B. Otherwise, the multiplex sublayer shall request that the physical layer send null traffic data.

7. Radio Link Protocol (RLP)

The RLP of the multiplex sublayer provides a message transmission service on forward and reverse traffic channels, substantially reducing the error rate typically exhibited by these channels. This service is intended to carry the variable length signaling messages of the Layer 210 protocol.

RLP divides the Layer 210 messages into traffic channel frames for transmission. A large packet may span multiple traffic channel frames, or a single traffic channel frame may contain all of a small message. RLP provides an indication of the start of Layer 210 messages.

8. RLP Frame Formats

The frame formats defined below are carried in the signaling part of traffic channel frames. These frame formats are implementation specific and are given by way of example, not limitation.

8a. RLP Control Frames

RLP control frames are distinguished by the CTL field. RLP control frames are used to initialize the RLP protocol.

| CTL | RSVD | FCS | Padding |
| --- | --- | --- | --- |
| 5 | 10 | 16 | variable |

CTL—RLP frame type. For RLP control frames, the CTL field is defined as follows:
'11001'—SYNC. Requests return of an RLP control frame with the ACK bit set.
'11010'—ACK. Acknowledges receipt of an RLP control frame with the SYNC bit set.
'11011'—SYNC/ACK. Indicates both SYNC and ACK.

RSVD—This reserved field shall contain '0000000000'.

FCS—Frame Check Sequence. The contents shall be as generated by the 16-bit FCS polynomial specified in 3.1 of RFC 1662. The FCS shall cover a 16-bit field consisting of a single bit of value '0', followed by the contents of CTL and RSVD fields.

Padding—Padding bits. As required to fill the remainder of the signaling part of the traffic channel frame. These bits shall be set to '0'.

8b. RLP Data Frames

RLP data frames carry a variable number of bits of signaling Layer 210 message data.

| CTL | SEQ | Data | Padding |
| --- | --- | --- | --- |
| 1 or 3 | 8 | variable | variable |

CTL—RLP frame type.
If a Layer 210 message begins with the first bit of the Data field, the CTL field shall be one bit in length, and shall be set to '0'. Otherwise, the CTL field shall be three bits in length, and shall be set to '100'.

SEQ—RLP data frame sequence number.

Data—Data bits. These bits shall contain signaling Layer 210 message data.

Padding—Padding bits.
If the remaining Layer 210 message data does not fill the signaling part of the traffic channel frame, padding bits shall be added as required to fill the remainder of the frame. These bits shall be set to '0'.

8c. RLP Idle Frames

RLP idle frames are distinguished by the CTL field.

RLP idle frames are not themselves sequence numbered, but contain the next data sequence number, in order that erased RLP data frames may be detected. The sequence number is not incremented after an RLP idle frame.

| CTL | SEQ | RSVD | FCS | Padding |
| --- | --- | --- | --- | --- |
| 5 | 8 | 2 | 16 | variable |

CTL—RLP frame type. For RLP idle frames, the CTL field shall be set to '11000'.

SEQ—RLP frame sequence number. This field shall be set to the current RLP transmit frame sequence number. The sequence number shall not be incremented following transmission of an RLP idle frame.

RSVD—This field shall contain '00'.

FCS—Frame Check Sequence. The contents shall be as generated by the 16-bit FCS polynomial specified in 3.1 of Internet RFC 1662. The FCS shall cover a 16-bit field consisting of a single bit of value '0', followed by the contents of the CTL, SEQ, and RSVD fields.

Padding—Padding bits. As required to fill the remainder of the signaling part of the traffic channel frame. These bits shall be set to '0'.

8d. RLP NAK Frames

RLP NAK frames are distinguished by the CTL field. RLP NAK frames are used to request retransmission of RLP data frames.

| CTL | FIRST | N_FR | FCS | Padding |
|---|---|---|---|---|
| 3 | 8 | 4 | 16 | variable |

CTL—RLP frame type. For RLP NAK frames, the CTL field shall be set to '101'.

FIRST—For RLP NAK frames, the FIRST field shall contain the sequence number of the first RLP data frame for which retransmission is requested.

N_FR—For RLP NAK frames, the N_FR field shall contain one less than the number of RLP data frames, starting with the frame whose sequence number is indicated by the FIRST field, for which retransmission is requested.

FCS—Frame Check Sequence. The contents shall be as generated by the 16-bit FCS polynomial specified in 3.1 of Internet RFC 1662. The FCS shall cover a 16-bit field consisting of a single bit of value '0', followed by the contents of the CTL, FIRST, and N_FR fields.

Padding—Padding bits. As required to fill the remainder of the signaling part of the traffic channel frame. These bits shall be set to '0'.

9. Procedures

9a. Initialization/Reset

The RLP protocol is established with a bidirectional handshake, after initialization of the traffic channel, to synchronize the connection.

When a traffic channel is initialized, when the multiplex option of the traffic channel is changed, and at other times as specified in this standard, the multiplex sublayer shall perform the RLP initialization/reset procedure below.

When RLP is initialized or reset, and when a SYNC RLP control frame is received, the multiplex sublayer shall perform the following:

1. Reset the send and receive state variables V(S), V(R), and V(N) to zero.
2. Set the consecutive erasure count E to zero.
3. Clear the resequencing buffers.
4. Disable all NAK retransmission timers and all NAK abort timers.
5. Disable the idle frame timer.
6. Discard any RLP data frames queued for retransmission.

When RLP is initialized or reset, it shall transmit a continuous stream of SYNC RLP control frames. When RLP receives a SYNC RLP control frame it shall respond with a SYNC/ACK RLP control frame, and shall continue sending SYNC/ACK RLP control frames until the next valid frame which is not a SYNC RLP control frame is received. When RLP receives a SYNC/ACK RLP control frame it shall respond with an ACK RLP control frame, and shall continue sending ACK RLP control frames until the next valid frame which is not a SYNC/ACK control frame is received. When RLP receives an ACK RLP control frame, it shall send no more SYNC, SYNC/ACK or ACK RLP control frames, and may begin sending RLP data frames.

The multiplex sublayer shall store in $RLP\_DELAY_S$ the number of frames received between the sending of the last SYNC or SYNC/ACK RLP control frame and reception of the first valid frame that is not an ACK or SYNC/ACK RLP control frame. $RLP\_DELAY_S$ is used in NAK retransmission timing.

9. Data Transfer

When transferring data, RLP is a pure NAK-based protocol. That is, the receiver does not acknowledge correct RLP data frames; it only requests the retransmission of RLP data frames that were not received.

All operations on RLP frame sequence numbers shall be carried out in unsigned modulo 256 arithmetic. Comparisons of two RLP frame sequence numbers shall also be modulo 256: for any RLP frame sequence number N, those sequence numbers from (N+1) modulo 256 to (N+127) modulo 256, inclusive, shall be considered greater than N while all sequence numbers from (N−128) modulo 256 to (N−1) modulo 256, inclusive, shall be considered less than N. (Note that (N−1) modulo 256 is equal to (N+255) modulo 256, and (N−128) modulo 256 is equal to (N+128) modulo 256.)

RLP shall maintain an 8-bit sequence number count V(S) for all transmitted RLP data frames. The sequence number field (SEQ) in each new RLP data frame sent and in each RLP idle frame sent shall be set to V(S). V(S) shall be incremented, modulo 256, after formatting each new RLP data frame sent. V(S) shall not be incremented after an RLP idle frame is sent.

RLP shall maintain two 8-bit sequence number variables for receiving, V(R) and V(N). V(R) contains the expected value of the RLP frame sequence number field in the next new traffic channel frame to be received. V(N) contains the sequence number of the next needed traffic channel frame not received in sequence.

RLP shall provide a storage buffer for resequencing of out-of-sequence RLP data frames both on the transmitting and on the receiving side. (I.e., two such buffers are required in a mobile station or base station.) These buffers shall each be able to store no fewer than 128 RLP data frames of the maximum size allowed for the multiplex subchannel carrying RLP.

For each valid received RLP data frame, RLP shall compare the sequence number to V(R) and V(N).

I. If the received RLP frame sequence number is less than V(N), or if the RLP data frame is already stored in the resequencing buffer, the RLP data frame shall be discarded as a duplicate.

II. If the received RLP frame sequence number is greater than or equal to V(N) and less than V(R), and the RLP data frame is not already stored in the resequencing buffer, then:

A. RLP shall store the received RLP data frame in the resequencing buffer.

B. If the RLP frame sequence number is equal to V(N), RLP shall pass the data in all contiguous RLP data frames in the resequencing buffer, from V(N) upward, to Layer 210, and shall remove the passed frames from the resequencing buffer. RLP shall then set V(N) to (LAST+1) modulo 256 where LAST is the sequence number of the last RLP data frame passed to Layer 210 from the resequencing buffer.

III. If the received RLP frame sequence number equals V(R), then:

A. If V(R) equals V(N), RLP shall increment V(N) and V(R), modulo 256, and shall pass all data bits in the RLP data frame to Layer 210.

B. If V(R) is not equal to V(N), RLP shall increment V(R), modulo 256, and shall store the received RLP data frame in the resequencing buffer.

IV. If the received sequence number is greater than V(R), then:
  A. RLP shall store the received RLP data frame in the resequencing buffer and shall set V(R) equal to the received sequence number.
  B. RLP shall then send one or more RLP NAK frames requesting the retransmission of all unreceived RLP data frames from V(N) to (V(R)–1) modulo 256, inclusive. RLP data frames requested in a previous RLP NAK frame whose NAK retransmission counter or NAK abort counter has not expired should not be included in these RLP NAK frames.
  C. RLP shall then increment V(R), modulo 256.

RLP shall also compare the sequence number in each valid received RLP idle frame to V(R).
  1. If the received RLP frame sequence number equals V(R), RLP shall take no further action.
  2. If the received RLP frame sequence number is greater than V(R), RLP shall set V(R) to the received frame sequence number, and shall then send one or more NAK frames requesting the retransmission of all unreceived RLP data frames with sequence numbers V(N) to (V(R)–1) modulo 256, inclusive. RLP data frames requested in a previous RLP NAK frame whose NAK retransmission counter or NAK abort counter has not expired should not be included in these NAK frames.

On receiving a NAK, RLP shall insert copies of the requested RLP data frame(s) into its output stream. If the NAK includes any sequence number greater than or equal to V(S) (this would indicate that the NAK process has fallen behind the sequence numbering by more than 128 frames), RLP shall perform the initialization/reset procedures. If the size of a retransmitted frame exceeds the number of bits available at the highest traffic channel frame rate allowed at the time of retransmission, RLP shall ignore the NAK. Further recovery is the responsibility of the Layer 210 protocol.

RLP shall maintain a NAK retransmission timer for each RLP data frame requested in an RLP NAK frame. The NAK retransmission timer shall be implemented as a frame counter. The NAK retransmission counter shall be incremented for the following traffic channel frame types:
  1. Traffic channel frames classified as erasures
  2. Valid traffic channel frames that do not contain signaling data.
  3. Valid traffic channel frames containing an RLP idle frame.
  4. Valid traffic channel frames containing a new RLP data frame (sequence number greater than or equal to V(R)).

The NAK retransmission counter shall not be incremented on receiving RLP control frames, NAK frames, nor old RLP data frames (sequence number less than V(R)). The NAK retransmission counter shall be considered expired when it is incremented to an implementation dependent value greater than RLP_DELAY$_S$. (It is recommended that a guard interval of five frames be added to the retransmission timeout to account for buffering within the mobile station or base station.)

If any RLP data frame requested has not arrived when its NAK retransmission timer expires, RLP shall send one or more RLP NAK frames requesting the retransmission of all unreceived RLP data frames from V(N) upward. RLP data frames requested in a previous RLP NAK frame whose NAK retransmission timer or NAK abort timer has not expired, should not be included in these NAK frames. RLP shall then restart the NAK retransmission timer for the RLP data frames requested.

If any RLP data frame requested has not arrived when its NAK retransmission timer expires for the second time, RLP shall send one or more RLP NAK frames requesting the retransmission of all unreceived RLP data frames from V(N) upward. RLP data frames requested in a previous RLP NAK frame whose NAK retransmission timer or NAK abort timer has not expired should not be included in these NAK frames. RLP shall then start a NAK abort timer for the RLP data frames requested. The NAK abort timer shall be implemented, and shall be considered expired, according to the same rules as a NAK retransmission timer.

If any RLP data frame requested has not arrived when its NAK abort timer expires, RLP shall set V(N) to the sequence number of the next missing frame, or to V(R) if there are no remaining missing frames, and shall pass any preceding RLP data frames in the resequencing buffer, in order of sequence number, to Layer 210. (Note that the preceding approach has been modified relative to that of TIA/EIA/IS-99 Data Services Option Standards for Wideband Spread Spectrum Digital Cellular Systems, 1995, which is in error regarding the handling of this case.) When a missing frame is skipped, RLP should provide an indication to Layer 210. Further recovery is the responsibility of the Layer 210 protocol.

Whenever a new RLP data frame is sent, RLP shall start an idle timer with duration $T_{xx}$ (100 ms). RLP shall also maintain an idle frame transmission counter, which shall initially be set to zero. If new Layer 210 signaling data are received at any time after the timer is started or after the timer has expired, the timer shall be disabled, any pending RLP idle frame shall be discarded, and the idle frame transmission counter shall be reset to zero.

When the idle timer expires, RLP shall form an RLP idle frame containing the current data frame sequence number V(S), shall increment the idle frame transmission count, and shall restart the idle timer. If the idle frame transmission count equals $N_{xx}$ (2), the idle timer shall be disabled. $N_{xx}$ and $T_{xx}$ are numerical constants and their values are determined based on the system requirements.

10. Frame Validity Checks

RLP shall discard as erasures all traffic channel frames received for which any of the following applies:
  1. The traffic channel frame has insufficient frame quality or is classified as zero rate.
  2. For RLP control and idle frames, the FCS field does not check.
  3. Any RLP frame field value is not within the allowable range.

All other traffic channel frames shall be considered valid, and shall be processed by RLP if they contain signaling data.

RLP shall maintain a count E of the consecutive frames classified as erasures. If the consecutive erasure count E exceeds 127, RLP shall perform an initialization/reset procedure.

11. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A system for wireless communication comprising:
    means for producing a first stream of voice encoded packets;
    means for producing a second stream of signaling message packets;
    means for prioritizing the signaling message packets in said second stream relative to the voice encoded packets in said first stream;
    means for arbitrating between the voice encoded packets and prioritized signaling message packets;
    means for multiplexing the voice encoded packets and prioritized signaling message packets as a function of the arbitration between the voice encoded packets and prioritized signaling message packets; and
    means for transmitting the multiplexed voice encoded packets and the prioritized signaling message packets.

2. The system of claim 1, further comprising:
    means for prioritizing the signaling message packets into high priority and low priority packets;
    wherein said means for arbitrating comprises means for scheduling the transmission of the multiplexed voice encoded packets and signaling message packets as a function of the assigned priority of the signaling message packets.

3. A system for wireless communication comprising:
    means for producing a first stream of voice encoded packets;
    means for producing a second stream of signaling message packets;
    means for prioritizing the signaling message packets in said second stream relative to the voice encoded packets in said first stream into high priority and low priority packets;
    means for arbitrating between the voice encoded packets and prioritized signaling message packets;
    means for multiplexing the voice encoded packets and prioritized signaling message packets as a function of the arbitration between the voice encoded packets and prioritized signaling message packets;
    means for transmitting the multiplexed voice encoded packets and the prioritized signaling message packets;
    said means for arbitrating comprising means for scheduling the transmission of the multiplexed voice encoded packets and signaling message packets as a function of the assigned priority of the signaling message packets; and
    means for changing the priority of the prioritized signaling message packets as a function of assigned maximum latency for transmitting signaling message packets.

4. The system of claim 1, further comprising:
    means for producing a first stream of voice encoded packets;
    means for producing a second stream of signaling message packets;
    means for prioritizing the signaling message packets in said second stream relative to the voice encoded packets in said first stream into high priority and low priority packets;
    means for arbitrating between the voice encoded packets and prioritized signaling message packets;
    means for multiplexing the voice encoded packets and prioritized signaling message packets as a function of the arbitration between the voice encoded packets and prioritized signaling message packets;
    means for transmitting the multiplexed voice encoded packets and the prioritized signaling message packets; and
    means for prioritizing the high priority signaling message packets into preemptive high priority and non-preemptive high priority packets.

5. The system of claim 1, wherein said means for prioritizing said signaling message packets includes means for assigning a priority delivery time to each signaling message packet.

6. The system of claim 1, further comprising means for producing a third stream of non-voice user information packets.

7. The system of claim 6, further comprising means for transmitting the multiplexed non-voice user information packets and the prioritized signaling message packets.

8. The system of claim 6, further comprising means for prioritizing the signaling message packets relative to the non-voice user information packets.

9. The system of claim 6, wherein said non-voice user information packets comprise secondary traffic.

10. A method for prioritizing traffic channel messages, comprising the steps of:
    producing a first stream of voice encoded packets;
    producing a second stream of signaling message packets;
    prioritizing the signaling message packets in said second stream relative to the voice encoded packets in said first stream;
    arbitrating between the voice encoded packets and prioritized signaling message packets;
    multiplexing the voice encoded packets and prioritized signaling message packets as a function of the arbitration between the voice encoded packets and prioritized signaling message packets; and
    transmitting the multiplexed voice encoded packets and the multiplexed prioritized signaling message packets.

11. The method of claim 10, further comprising the step of:
    prioritizing the signaling message packets into high priority and low priority packets;
    wherein said step of arbitrating comprises the step of scheduling the transmission of the multiplexed voice encoded packets and the signaling message packets as a function of the assigned priority of the signaling message packets.

12. A method for prioritizing traffic channel messages comprising the steps of:
    producing a first stream of voice encoded packets;
    producing a second stream of signaling message packets;
    prioritizing the signaling message packets in said second stream relative to the voice encoded packets in said first stream into high priority and low priority packets;
    arbitrating between the voice encoded packets and prioritized signaling message packets;
    multiplexing the voice encoded packets and prioritized signaling message packets as a function of the arbitration between the voice encoded packets and prioritized signaling message packets;
    transmitting the multiplexed voice encoded packets and the multiplexed prioritized signaling message packets;
    said step of arbitrating comprises the step of scheduling the transmission of the multiplexed voice encoded packets and the signaling message packets as a function of the assigned priority of the signaling message packets; and changing the priority of the prioritized signaling message packets as a function of assigned maximum latency for transmitting signaling message packets.

13. A method for prioritizing traffic channel messages comprising the steps of:

producing a first stream of voice encoded packets;

producing a second stream of signaling message packets;

prioritizing the signaling message packets in said second stream relative to the voice encoded packets in said first stream into high priority and low priority packets and prioritizing the high priority signaling message packets into preemptive high priority and non-preemptive high priority packets;

arbitrating between the voice encoded packets and prioritized signaling message packets;

multiplexing the voice encoded packets and prioritized signaling message packets as a function of the arbitration between the voice encoded packets and prioritized signaling message packets;

transmitting the multiplexed voice encoded packets and the multiplexed prioritized signaling message packets.

14. The method of claim 10, wherein said step of prioritizing said signaling message packets comprises the step of assigning a priority delivery time to each signaling message packet.

15. The method of claim 10, further comprising the step of producing a third stream of non-voice user information packets.

16. The method of claim 15, further comprising the step of transmitting the multiplexed non-voice user information packets and the prioritized signaling message packets.

17. The method of claim 15, further comprising the step of prioritizing the signaling message packets relative to the non-voice user information packets.

18. The method of claim 15, wherein said non-voice user information packets comprise secondary traffic.

19. An apparatus for prioritizing traffic channel messages, comprising:

a first stream of voice encoded packets;

a second stream of signaling message packets, said signaling message packets being prioritized in said second stream;

an arbitrator, coupled to said first stream, and said second stream, for arbitrating between said voice encoded packets and said prioritized signaling message packets;

a multiplexer, coupled to said first stream, said second stream, and said arbitrator, for multiplexing said voice encoded packets and said prioritized signaling message packets as a function of the arbitration between the voice encoded packets and prioritized signaling message packets; and a transmitter, coupled to said multiplexer, for transmitting said multiplexed voice encoded packets and multiplexed prioritized signaling message packets.

20. The apparatus of claim 19, wherein said signaling message packets are prioritized into high priority and low priority packets, and wherein said arbitrator comprises a scheduler for scheduling the transmission of the multiplexed voice encoded packets and the multiplexed signaling message packets as a function of the assigned priority of the voice encoded packets and the signaling message packets.

21. An apparatus for prioritizing traffic channel messages comprising:

a first stream of voice encoded packets;

a second stream of signaling message packets, said signaling message packets being prioritized in said second stream into high priority and low priority packets;

an arbitrator, coupled to said first stream, and said second stream, for arbitrating between said voice encoded packets and said prioritized signaling message packets;

a multiplexer, coupled to said first stream, said second stream, and said arbitrator, for multiplexing said voice encoded packets and said prioritized signaling message packets as a function of the arbitration between the voice encoded packets and prioritized signaling message packets; and a transmitter, coupled to said multiplexer, for transmitting said multiplexed voice encoded packets and multiplexed prioritized signaling message packets;

said arbitrator comprisings a scheduler for scheduling the transmission of the multiplexed voice encoded packets and the multiplexed signaling message packets as a function of the assigned priority of the voice encoded packets and the signaling message packets; and means for changing the priority of the prioritized signaling message packets as a function of assigned maximum latency for transmitting signaling message packets.

22. The apparatus of claim 19, wherein said signaling message packets are assigned a priority delivery time.

* * * * *